United States Patent [19]
Gamache et al.

[11] Patent Number: 5,630,166
[45] Date of Patent: May 13, 1997

[54] CONTROLLING REQUESTS FOR ACCESS TO RESOURCES MADE BY MULTIPLE PROCESSORS OVER A SHARED BUS

[75] Inventors: Rodney Gamache, Merrimac; Stuart Farnham, Brookline; Michael Harvey, Nashua, all of N.H.; William A. Laing, Newbury, England; Kathleen Morse, Hollis, N.H.; Michael Uhler, Marlboro, Mass.

[73] Assignee: Digital Equipment Corporation, Maynard, Mass.

[21] Appl. No.: 703,622

[22] Filed: Aug. 27, 1996

Related U.S. Application Data

[63] Continuation of Ser. No. 884,258, May 8, 1992, abandoned, which is a continuation of Ser. No. 378,436, Jul. 10, 1989, abandoned, which is a continuation of Ser. No. 159,185, Feb. 23, 1988, abandoned.

[51] Int. Cl.⁶ .............................. G06F 12/02; G06F 13/20
[52] U.S. Cl. ........................... 395/800; 395/674; 395/287; 395/728; 364/DIG. 1; 364/DIG. 2
[58] Field of Search ........................ 395/600, 181, 395/650, 700, 800, 500, 200.03, 730, 200.15, 292, 200.16, 474, 729, 183.2, 728, 182.02; 364/DIG. 1, DIG. 2; 340/825.31

[56] References Cited

U.S. PATENT DOCUMENTS

| | | | |
|---|---|---|---|
| 4,096,571 | 6/1978 | Vander Mey | 395/425 |
| 4,149,245 | 4/1979 | Gannon | 364/200 |
| 4,317,168 | 2/1982 | Messina et al. | 364/200 |
| 4,393,459 | 7/1983 | Huntley et al. | 395/725 |
| 4,530,055 | 7/1985 | Hamstra et al. | 364/200 |
| 4,547,849 | 10/1985 | Louie et al. | 364/200 |
| 4,547,850 | 10/1985 | Genma | 364/200 |
| 4,590,555 | 5/1986 | Bourrez | 364/200 |
| 4,642,758 | 2/1987 | Teng | 364/200 |
| 4,648,065 | 3/1987 | Zenk | 364/900 |
| 4,873,687 | 10/1989 | Breu | 395/182.02 |
| 4,888,726 | 12/1989 | Struger et al. | 395/200 |
| 4,897,780 | 1/1990 | Lakness | 364/200 |
| 4,932,040 | 6/1990 | Barlow | 364/200 |
| 4,942,552 | 7/1990 | Mehill et al. | 395/275 |
| 4,984,153 | 1/1991 | Kregness et al. | 395/479 |
| 5,055,999 | 10/1991 | Frank et al. | 395/425 |

FOREIGN PATENT DOCUMENTS

| | | |
|---|---|---|
| 0351556 | 1/1990 | European Pat. Off. . |
| WO89/06011 | 6/1989 | WIPO . |

OTHER PUBLICATIONS

Design Entry, *Electronic Design* Sep. 6, 1984.

*Primary Examiner*—Daniel H. Pan
*Attorney, Agent, or Firm*—Fish & Richardson P.C.

[57] ABSTRACT

A plurality of processors each includes a central processor unit for processing programs at predetermined synchronization priority levels and a cache memory. A memory shared by all of the processors includes an synchronization level table which identifies a processor operating at each synchronization priority level. A common bus interconnects the processors and the memory. When a processor is to execute a program, it adjusts its synchronization priority level to a predetermined synchronization priority level by accessing the synchronization level table over the common bus to determine whether the level is accessible and, if so, places an entry in the table to indicate that the synchronization priority level is occupied. If the synchronization priority level is not accessible, the processor continually monitors the entry in the table over the common bus to determine when it is accessible by monitoring its cache, which contains a copy of the table entry associated with the synchronization priority level. When the synchronization priority level becomes accessible, the cache copy is invalidated so that the processor then has to use the table.

31 Claims, 1 Drawing Sheet

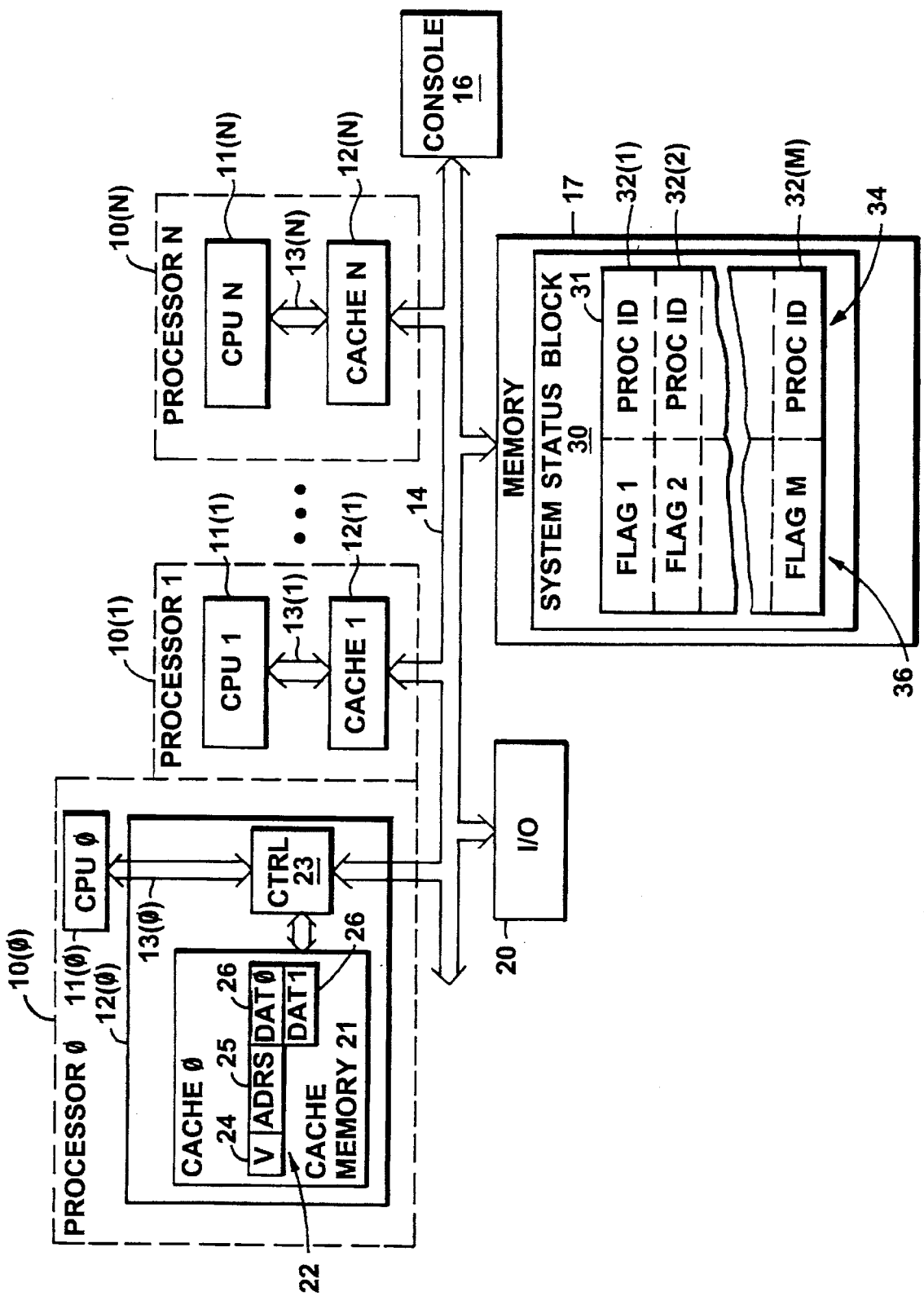

CONTROLLING REQUESTS FOR ACCESS TO RESOURCES MADE BY MULTIPLE PROCESSORS OVER A SHARED BUS

This is a continuation of application Ser. No. 07/884,258, filed May 8, 1992, now abandoned, which is a continuation of application Ser. No. 07/378,436, filed Jul. 10, 1989, now abandoned, which is a continuation of application Ser. No. 07/159,185, filed Feb. 23, 1988, now abandoned.

BACKGROUND OF THE INVENTION

1. Field of the Invention

The invention relates generally to the field of digital data processing systems, and more specifically to mechanisms for controlling access to code and data which may be shared in a digital data processing system including multiple processors.

2. Description of the Prior Art

A digital data processing system includes three basic elements, namely, a processor element, a memory element and an input/output element. The memory element stores information in addressable storage locations. This information includes data and instructions for processing the data. The processor element fetches information from the memory element, interprets the information as either an instruction or data, processes the data in accordance with the instructions, and returns the processed data to the memory element for storage therein. The input/output element, under control of the processor element, also communicates with the memory element to transfer information, including instructions and data to be processed, to the memory, and to obtain processed data from the memory.

Typically, an input/output element includes a number of diverse types of units, including video display terminals, printers, interfaces to the public telecommunications network, and secondary storage subsystems, including disk and tape storage devices. A video display terminal permits a user to run programs and input data and view processed data. A printer permits a user to obtain processed data on paper. An interface to the public telecommunications network permits transfer of information over the public telecommunications network.

To increase processing speed, digital data processing systems have been developed which include multiple processors. Such multi-processing systems are generally organized along two paradigms for controlling operations within a system. In one paradigm, called "master-slave", one processor operates as a master processor, essentially assigning jobs to the other processors, which operate as slave processors. The master processor may also perform similar jobs as a slave processor while it is not performing its assignment functions. Control is simplified in systems designed along the master-slave paradigm since a single processor, namely, the master processor, is responsible for assigning the jobs. However, in such systems, if the master processor malfunctions, the entire system may be inoperative. In addition, under heavy processing loads, the master processor may become overloaded, which will slow down assignments of jobs to the slave processors.

Problems with systems designed along the master-slave paradigm do not arise in systems designed along the second paradigm, in which assignment of work is handled in a more homogeneous manner. In this paradigm, jobs are identified in a list stored in memory which may be accessed by any processor in the system. When a processor becomes available, it may retrieve an item from the job list for processing. Loading items onto the job list is, itself a job which can be performed by any of the processors, thus control of the job list is also decentralized among all of the processors. Since all of the processors can perform these control functions, if any of them malfunctions the system can remain operative, although at a reduced processing speed.

While decentralization of the control functions in a multiple processing system provides some advantages over systems employing master-slave control, decentralized systems can also have problems if the operating system, the program which controls the processors and job scheduling, does not provide good coordination and communication among the processors. It is necessary, in a decentralized system, to ensure that, for example, two processors do not attempt to execute the same critical section or region at the same time. A critical region is a portion of a program in which memory shared among the processors is accessed [see, for example, A. Tanenbaum, Operating Systems: Design and Implementation, (Prentice-Hall, 1987), at page 53]. If two processors attempt to execute a critical region of a program at the same time, they may access data in the same storage location in an overlapping, rather than sequential, manner, which will result in an erroneous result. This problem can occur if the system does not provide good synchronization among critical regions.

Typically, flags are used to provide synchronization of access to critical regions of programs and of shared data structures processed thereby. The flags, which comprise storage locations in memory which are shared among processors in the system, can be used to indicate the status of a critical region that is, whether or not a critical region, is being executed. When a processor wishes to execute a critical region, it can set the flag associated with the critical region to inform other processors that the critical region is being executed. If another processor wishes to execute the same critical region, it determines the condition of the flag, and, if the flag does not indicate that the critical region is being executed by another processor, may itself execute the critical region, first conditioning the flag to indicate that the critical region is being executed. On the other hand, if the flag does indicate that the critical region is being executed by another processor, the processor wishing to execute the critical region delays, continuing to test the flag until it is changed to indicate that the critical region is not being executed by another processor.

The use of flags to control access to a shared critical region does create several problems. One problem, termed a "race" condition, may occur if two processors request the same critical region at the same time. If neither is able to condition the flag to indicate that the critical region is being executed before the other tests the condition of the flag, both may execute the critical region. Another problem, termed "deadlock" occurs when two processors need to execute the critical region currently being processed by the other. Since neither can release the critical region each is executing, neither can begin executing the other critical region. As a result, both processors are deadlocked.

To alleviate race and deadlock problems, more sophisticated control mechanisms, known as semaphores, have been developed. A semaphore manages control of the synchronization flags and gives permission to one processor if several request access to the same critical region at the same time. When a processor finishes execution of a critical region, it informs the semaphore, which is responsible for conditioning the flags. A problem arises, however, since, if a processor is denied access to a critical region, it may continually attempt to obtain permission from the semaphore until it gives permission to the processor to execute the critical region. If this occurs with sufficient numbers of the processors in the multiple processor system, the communications system in the digital data processing system may be so overloaded with requests that no other communication can take place. At this point, the system is effectively unable to perform processing work.

SUMMARY OF THE INVENTION

The invention provides a new and improved mechanism for synchronizing execution of shared critical regions in a digital data processing system.

In brief summary, the digital data processing system includes a plurality of processors, each including a central processor unit for processing programs at predetermined synchronization priority levels and a cache memory. A memory shared by all of the processors includes a synchronization level table which identifies a processor operating at the various synchronization priority levels. A common bus interconnects the processors and the memory. When a processor is to execute a critical region, it adjusts its synchronization priority level to a predetermined level. In that operation, the processor accesses the synchronization level table to determine whether the synchronization priority level is accessible and, if so, places an entry in the table to indicate that the synchronization priority level is occupied. If the synchronization priority level is not accessible, the processor continually monitors the entry in the synchronization level table to determine when it is accessible. In that operation, the processor monitors its cache, which contains a copy of the table entry associated with the synchronization priority level, rather than the entry in the memory, thereby minimizing the number of transfers required with the memory over the common bus. When the synchronization priority level becomes accessible, the cache copy is invalidated so that the processor then has to use the table in the memory.

BRIEF DESCRIPTION OF THE DRAWINGS

This invention is pointed out with particularity in the appended claims. The above and further advantages of this invention may be better understood by referring to the following description taken in conjunction with the accompanying FIG. 1, which depicts a block diagram of a digital data processing system constructed in accordance with the invention.

DETAILED DESCRIPTION OF AN ILLUSTRATIVE EMBODIMENT

Referring to FIG. 1, a digital data processing system constructed in accordance with the invention includes one or more processors 10(0) through 10(N) (generally identified by reference numeral 10) each including a central processing unit 11(0) through 11(N) (generally identified by reference numeral 11) and a cache 12(0) through 12(N) (generally identified by reference numeral 12) interconnected by a bus 13(0) through 13(N) (generally identified by reference numeral 13). Each of the caches 12 in each of the processors 10 is also connected to a bus 14. The bus 14 permits the processors 10 to communicate with each other and with a console 16, a memory 17, and one or more input/output units 20.

Each central processor unit 11 executes instructions that are stored in addressable storage locations in the memory 17. The instructions identify operations that are to be performed on operands, which are also stored in addressable locations in the memory 17. The instructions and operands are fetched by the central processor units 11 as they are needed, and processed data are returned for storage in the memory 17. The central processor units 11 also transmit control information to the input/output units 20, enabling them to perform selected operations, such as transmitting data to or retrieving data from the memory 17. Such data may include instructions or operands which may be transmitted to the memory 17 or processed data which is retrieved from the memory 17 for storage or display.

An operators console 16 serves as the operator's interface. It allows the operator to examine and deposit data, halt the operation of the central processor unit 11 or step the central processor unit 11 through a sequence of instructions and determine the responses of the central processor unit 11 in response thereto. It also enables an operator to initialize the system through a boot strap procedure, and perform various diagnostic tests on the entire data processing system. As is typical, the console 16 may be connected directly to each processor 10, or to selected processors, over communications mechanisms other than bus 14.

The memory 17 includes a memory controller, which is connected directly to the bus 14 and to a plurality of arrays. The arrays contain a plurality of addressable storage location in which information is stored. The memory controller receives transfer requests from the central processor units 11 or an input/output unit 20 over the bus 14. Several types of transfer requests may be transmitted over bus 14, which fall into two general categories. In one category, information is written into, or stored in, a storage location, and in the other category, information is retrieved, or read, from a storage location, the storage location being identified by an address transmitted with the transfer request.

The digital data processing system depicted in FIG. 1 may include several types of input/output units 20, including disk and tape secondary storage units, teletypewriters, video display terminals, line printers, telephone and computer network interface units, and the like. The disk secondary storage units may provide mass storage of data which, under control of central processor unit 11, is transferred to and from the memory 17.

The caches 12 used in the system depicted in the Figure are conventional caches. Since all of the caches 12 are similar, only cache 12(0) is depicted in detail. As is conventional, cache 12(0) includes a cache memory 21 including a plurality of cache entries generally identified by reference numeral 22, one of which is depicted in the Figure, and a cache control circuit 23. Each cache entry 22 maintains a copy of information from a selected number of locations in memory 17. The cache control circuit 23 maintains the information in the entries of cache memory 21 from locations in memory 17 from which the processor 10, and specifically central processor unit 11, has recently retrieved information.

Each entry 22 in the cache memory 21 includes several fields, including a validity flag 24, an address field 25 and one or more data fields 26. The contents of the address field 25 identifies the location of memory 17 from which the data in the data fields 26 was copied. The validity flag 24 indicates whether the entry 22 contains valid data. That is, if the validity flag 24 is set, the data fields 26 in the entry 22 contain a valid or correct copy of the data in the location identified by the address in the address field 25. On the other hand, if the validity flag 24 is not set, the data fields 26 in the entry 22 do not contain a correct copy of the data in the location identified by the address in the address field, as described below.

When the central processor unit 11 needs to retrieve information from a selected location in the memory 17, it transmits a retrieval request over bus 13 to the cache 12, and specifically the cache control circuit 23. In initiating the retrieval operation, the central processor unit 11 identifies by address the location in memory 17 which contains the required information. The cache control circuit 23 searches through the contents of the address fields 25 in the entries 22 in the cache memory 21 to determine if one of the address fields contains the address received from the central processor unit 11. If one does, and if the validity flag 24 of the entry 22 is set, the cache control circuit 23 retrieves the contents of a data field 26 for transmission over 13 to the central processor unit 11.

On the other hand, if the cache control circuit 23 determines (1) that the contents of the address field 25 of an entry 22 corresponds to the address received from central processor unit 11 but that the validity flag 24 of that entry is reset, or (2) that none of the contents of the address fields 25 of entries 22 correspond to the address received from central processor unit 11, the cache control circuit 23 initiates a retrieval operation over bus 14 to retrieve the contents of the identified location. In this operation, the cache control circuit 23 identifies the location identified by the central processor unit 11. Typically, the cache control circuit 23 will contemporaneously initiate retrieval of information from proximate locations in memory 17. The memory 17 returns the contents of the identified locations over bus 14, and the cache control circuit 23 then transmits the information from the requested locations in memory 17 to the central processor unit 11 over bus 13 and stores the information in the data fields 26 in its cache memory 21, with the contents of each location retrieved from memory 17 being stored in a data field 26 in the entry 22 in cache memory 21, with the validity flag 24 set in the entry 22.

If, on the other hand, the cache control circuit determines that an entry 22 in cache memory 21 does contain a copy of the contents of the location in memory 17 requested by the central processor unit 11, it retrieves the data from a data field 26 and transfers it to the central processor unit 11 over the bus 13. In this situation, the cache 12 does not have to perform a transfer over bus 14 to supply the central processor unit 11 with the requested information, which can reduce transfers over bus 14.

When a central processor unit 11 initiates a write operation to transfer information for storage in an identified location in memory 17, it transmits the information and the identification of the location in which the information is to be stored over bus 13. In one embodiment in which the cache 12 is a write through cache, when the central processor unit 11 initiates a transfer to store information in a location in memory 17, the cache control circuit 23 initiates a transfer over bus 14 to enable the information to be stored in the identified location in memory 17. In addition, the cache control circuit determines whether the contents of the address field 25 in an entry 22 in the cache memory correspond to the address received from the central processor unit 11. If so, it may either store the information in a data field 26 in the entry, over-writing the information with the new information, or reset the valid flag 24 of the entry 22 so that the cache control circuit 23 will retrieve the information from the memory 17 when it next receives a retrieval request from the central processor unit 11 identifying the location in memory 17.

The cache control circuit 23 also monitors the write operations initiated by other processors 10 over bus 14. When the cache control circuit receives a write operation over bus 14 which identifies a location in memory 17 whose address corresponds to the address contained in the address field 25 of an entry 22 in cache memory 21, the cache control circuit 23 resets the valid flag 24 of the entry 22. When the central processor unit 11 later requests retrieval identifying the location, the cache control circuit 23 then initiates the retrieval operation from memory 17 over bus 14.

As noted above, the memory 17 includes a plurality of addressable storage locations, some of which comprise a system status block 30 in which is stored status information used by all of the processors 10. The system status block 30 includes a synchronization table 31 which, in turn, includes a plurality of entries 32(1) through 32(M) (generally identified by reference numeral 32). Each entry 32 includes two fields, including a flag field 36 and a processor identification field 34.

By way of background, the processors 10 in the digital data processing system depicted in the Figure operate in one of a plurality of synchronization priority levels. In one embodiment, in which the digital data processing system is a VAX system sold by, and as described in the VAX-11 Architecture Reference Manual published by, Digital Equipment Corporation, the assignee of the present application, the synchronization priority levels are related to interrupt priority levels. In that embodiment, there are thirty two interrupt priority levels, sixteen of which are used for software interrupts, which allow programs to request services from, and synchronize calls to, the operating system, and the remaining sixteen are used for hardware interrupts. Each interrupt priority level is associated with several synchronization priority levels, with each synchronization priority level controlling access to selected data structures, and thus critical regions which use the data structures, that form part of programs which are processed at that interrupt priority level. It will be appreciated, therefore, that the synchronization priority level synchronizes access to data structures as well as synchronizing processing of critical regions of programs.

The central processor unit 11 in each processor 10 is maintained at a synchronization priority level. Each critical region in a program which may be processed by the processors 10 in the system is assigned a synchronization priority level, and to process any program at a priority level, the processor must adjust its synchronization priority level prior to processing the critical region. Since all of the programs in the system, and thus all of the program's critical regions, can be processed by any of the processors 10, to synchronize processing within the system, only one processor 10 can be operating at each synchronization priority level at one time.

The system synchronization level table 31 includes one entry 32 for each of the synchronization priority levels in the digital data processing system, with the order of the entry 32 in the table corresponding to the entry's associated synchronization priority level.

The processor identification field 34 in each entry 32 identifies the processor 10, if any, which is operating at the synchronization priority level identified by the entry's synchronization priority level. If no processor 10 is operating at the synchronization priority level, the processor identification field 34 is empty.

The flag 36 in each entry 32 indicates whether a processor is operating at the entry's associated synchronization priority level. If the flag 36 in an entry 32 is clear, no processor is operating at that synchronization priority level. On the other hand, if the flag 36 in an entry 32 is set, the processor 10 which is identified in processor identification field 34 of the entry 32 is operating at the entry's synchronization priority level.

When a processor 10, and specifically a central processor unit 11, needs to execute a critical region of a program which requires a specific synchronization priority level, the processor 10 executes a conventional semaphore program which controls the synchronization level table 31 and, thus, access to the various synchronization priority levels. In that operation, the processor 10, under control of the semaphore program, retrieves the contents of and interrogates the entry 32 in the synchronization level table 31 associated with that synchronization priority level. If the flag 36 of the entry 32 is clear, no processor 10 is currently operating at that synchronization priority level, and so, if the processor 10 is the only processor 10 requiring use of that synchronization priority level, the semaphore program loads the identification of the processor 10 into the processor identification field 34 in that entry 32 to indicate that the synchronization priority level associated with the entry 32 is occupied by the processor 10 and sets the flag 36 in the entry 32 to indicate that the synchronization priority level is occupied. The processor 10 then processes the critical region and, when it is finished, clears the flag 36 of the entry 32 to indicate that the synchronization priority level is available.

On the other hand, if two or more processors require use of the Same synchronization priority level, the processors each process the semaphore program to jointly determine which processor 10 may use the synchronization priority level. The semaphore program executing on the winning processor 10 sets the flag 36 and loads its identification into the processor identification field 34 of the entry 32 in the synchronization level table 31 associated with the synchronization priority level. The winning processor 10 then processes the critical region and, when it is finished, clears the flag 36 of the entry 32 to indicate that the synchronization priority level is available.

While the winning processor 10 is executing a critical region at the synchronization priority level, the losing processor or processors 10 continue their attempts to obtain access to the synchronization priority level. In that operation, they continually monitor the condition of the entry 32, and specifically the entry's flag 36, in the synchronization level table 31 to determine when the winning processor 10 clears the flag 36 to indicate that the synchronization priority level associated with the entry 32 is available. To do this, the central processor unit 11 repeatedly initiates retrieval operations over its bus 13 to retrieve the contents of the storage location in memory 17 in which the entry 32 is stored.

It will be appreciated that, once the cache control circuit 23 has retrieved the contents of the storage location from memory 17 and stores them in the cache memory 21, it thereafter retrieves the contents of the cache entry 22 which stores the copy of the entry 32 from the synchronization level table 31, until the processor 10 that won the use of the synchronization priority level performs a write operation over bus 14 to clear the flag 36 in the entry 32 associated with the synchronization priority level. When that occurs, the cache control circuits 23 in the other processors invalidate their cache entries 22 for that location in memory 17. Thus, when the central processor units 11 next initiate retrieval operations to retrieve the flag 36, the cache control circuits 23 will perform the retrieval operation with memory 17, rather than their caches 21, to thereby retrieve the updated flag 36 from the system status block 30 in memory 17.

Since the cache control circuits 23 in the caches 12 of the losing processors 10 are not repeatedly attempting to retrieve the contents of the entry 32 in the synchronization level table 31, but are instead using the contents of the cache entry 22 in the cache memory 21, operations over bus 14 are substantially reduced. Indeed, when the winning processor 10 performs an operation with the entry 32 to relinquish the synchronization priority level, it will not be delayed or prevented from performing the operation over bus 14 by repeated attempts by the losing processors 10 to retrieve the contents of the entry 32.

Further, it will be appreciated that the winning processor 10, when it relinquishes the synchronization priority level, performs a write operation to reset the contents of the flag 36 of cache entry 32. Since the cache control circuits 23 monitor write operations over bus 14 to reset the flags 36 of cache entries 22 whose address fields 25 are identified in the write operation, when the winning processor performs the write operation to relinquish the synchronization priority level, the cache control circuits 23 in the losing processors 10 will reset the valid flags 24 of the cache entries 22 whose address fields 25 identify the storage location in memory 17 which contains the entry 32. Thereafter, when the central processor unit 11 in a losing processor 10 transmits a retrieval request to the cache control circuit 23 to initiate retrieval of the entry 32 from the synchronization level table 31, the cache control circuit 23 will initiate an operation over the bus 14 to retrieve the entry from memory 17. Since this occurs only after the winning processor 10 has conditioned the entry 32 to indicate that the synchronization priority level is available, the losing processors 10 will not initiate operations over bus 14 until the synchronization priority level is available.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A processor for use in a data processing system that includes a plurality of processors which access multiple resources over a bus shared by said processors, and a system memory connected to the bus for storing entries each of which corresponds to one of said resources and designates whether said resource is available for use, said processor comprising a processing unit for generating a request for access to one of said resources, said request identifying said resource, a local memory for storing copies of said system memory entries, and a controller for examining said copies of said entries stored in said local memory in response to said request to determine whether said resource identified in said request is available for use by said processing unit, said controller preventing said request from being transmitted over said bus if one of said copies of said entries stored in said local memory designates said identified resource as being unavailable, and otherwise transmitting said request over said bus, said controller comprising means for determining when said identified resource has become available, and means for updating the copy of said entry stored in said local memory that corresponds to said identified resource to indicate that said identified resource has become available in response to said determining, said controller thereafter permitting a subsequent request for access to said identified resource to be transmitted over said bus.

2. The processor of claim 1 wherein said controller is adapted to notify said processing unit that said identified resource is unavailable if said resource is so designated by one of said copies of said entries stored in said local memory.

3. The processor of claim 2 wherein said processing unit is adapted to repeat said request for access at least once in response to said notification that said identified resource is unavailable, said controller being adapted to respond to each repeated request by preventing said request from being transmitted over said bus if said one of said copies of said entries stored in said local memory indicates that said identified resource is unavailable, and otherwise transmitting said request over said bus.

4. The processor of claim 1 wherein said controller is adapted to transmit said request over said bus if said local memory does not contain a copy of an entry that corresponds to said identified resource and to receive a reply from said system memory that includes contents of a said entry in said system memory that corresponds to said identified resource and indicates whether said resource is available, create a copy of said received entry in said local memory, and notify said processing unit that said request for access is granted if said contents of said reply indicate that said identified resource is available.

5. The processor of claim 4 wherein said controller is further adapted to notify said processing unit that said request for access is denied if said contents of said reply indicate that said identified resource is unavailable.

6. The processor of claim 4 wherein said controller comprises means for monitoring said bus to detect that a said resource which is unavailable may have become available, said monitoring means updating a copy of an entry stored in said local memory that corresponds to said available resource to indicate that said resource is available, whereby said controller responds to a subsequent request that identifies said available resource by transmitting said request over said bus.

7. The processor of claim 1 wherein said local memory comprises a cache memory.

8. A data processing system comprising a plurality of processors that access multiple resources over a bus shared by said processors, and a system memory connected to the bus for storing entries each of which corresponds to one of said resources and designates whether said resource is available for use, each of said processors comprising a processing unit for generating a request for access to one of said resources, said request identifying said resource, a local memory for storing copies of said system memory entries, and a controller for examining said copies of said entries stored in said local memory in response to said request to determine whether said resource identified in said request is available for use by said processing unit, said controller preventing said request from being transmitted over said bus if one of said copies of said entries stored in said local memory designates said identified resource as being unavailable, and otherwise transmitting said request over said bus, said controller comprising means for determining when said identified resource has become available, and means for updating the copy of said entry stored in said local memory that corresponds to said identified resource to indicate that said identified resource has become available in response to said determining, said controller thereafter permitting a subsequent request for access to said identified resource to be transmitted over said bus.

9. The system of claim 8 wherein each of said entries in said system memory indicates whether the corresponding resource is being used by one of said processors, and further comprising a manager for responding to each said request for access transmitted by a said processor over said bus by denying said request if the entry corresponding to the resource identified in said request indicates that said resource is being used by another one of said processors, and otherwise granting said request.

10. The system of claim 9 wherein said manager is adapted to update the entry in said system memory that corresponds to the resource identified in each request for access granted by said manager to indicate that said resource is being used by said processor that transmitted said request for access.

11. The system of claim 9 wherein each of said resources comprises a portion of a sequence of instructions being executed by said processors.

12. The system of claim 9 wherein each of said resources comprises a mode of operation of said processors.

13. The system of claim 10 wherein said controller is adapted to respond to said denial of said request by notifying said processing unit that said identified resource is unavailable, and creating in said local memory a copy of said entry that corresponds to said identified resource.

14. The system of claim 13 wherein each said controller is adapted to respond to said granting of said request by notifying said processing unit that said resource is available, said controller further being adapted to transmit a message over said bus when said processor has completed using said resource.

15. The system of claim 14 wherein said manager is adapted to respond to said message by updating the entry in said system memory that corresponds to said resource to indicate that said resource is no longer being used by said processor.

16. The system of claim 14 wherein said message identifies said resource, each said controller including means for monitoring said bus for said message, said monitoring means determining whether said local memory includes a said copy of a said entry that indicates that said resource identified in said message is unavailable and, if so, invalidating said copy.

17. A data processing system comprising a plurality of processors interconnected by a bus, said processors having a plurality of possible modes of operation, and a system memory connected to said bus, said system memory including a plurality of entries each of which corresponds to one of said modes of operation and indicates whether said mode is available for use by one of said processors, each of said processors including:

a processing unit for generating a request to operate in one of said modes, said request identifying said mode, a local memory for storing copies of said system memory entries, and a controller for examining said copies of said entries stored in said local memory in response to said request to determine whether said mode identified in said request is available for use by said processing unit, said controller preventing said request from being transmitted over said bus if one of said copies of said entries stored in said local memory designates said mode identified in said request as being unavailable, and otherwise transmitting said request over said bus.

18. The system of claim 17 wherein only one of said processors at a time is permitted to operate in each of said modes, each of said system memory entries indicating whether one of said processors is operating in the mode to which said entry corresponds.

19. The system of claim 18 wherein said system memory includes a manager for responding to each said request transmitted by a said processor over said bus by denying said request if the system memory entry that corresponds to said identified mode indicates that said mode is being operated in by another one of said processors, and otherwise granting said request.

20. The system of claim 19 wherein said manager is adapted to update the system memory entry that corresponds to the mode identified in each request granted by said manager to indicate that said mode is being operated in by said processor that transmitted said request.

21. The system of claim 20 wherein said controller is adapted to respond to said denial of said request by notifying said processing unit that said identified mode is unavailable, and creating in said local memory a copy of said entry that corresponds to said identified mode.

22. The system of claim 21 wherein each said controller is adapted to respond to said granting of said request by notifying said processing unit that said mode is available, said controller further being adapted to transmit a message over said bus when said processor has completed operating in said mode.

23. The system of claim 22 wherein said manager is adapted to respond to said message by updating the system memory entry that corresponds to said mode to indicate that said mode is no longer being operated in by said processor.

24. The system of claim 22 wherein said message identifies said mode, each said controller including means for monitoring said bus for said message, said monitoring means determining whether said local memory includes a said copy of a said entry that indicates that said mode identified in said message is unavailable and, if so, invalidating said copy.

25. The system of claim 17 wherein said local memory comprises a cache.

26. A method for operating a processor in a data processing system that includes a plurality of processors which access multiple resources over a bus shared by said processors, and a system memory connected to the bus for storing a table of entries each of which corresponds to one of said resources and designates whether said resource is available for use, said method comprising generating a request for access to one of said resources, said request identifying said resource, storing in a local memory in said processor copies of said system memory entries, examining said copies of said entries stored in said local memory in response to said request for access to determine whether said resource identified in said request is available for use, preventing said request from being transmitted over said bus if one of said copies of said entries stored in said local memory designates said identified resource as being unavailable, and otherwise transmitting said request over said bus, determining when said identified resource has become available, updating the copy of said entry stored in said local memory that corresponds to said identified resource to indicate that said identified resource has become available in response to said determining, and thereafter permitting a subsequent request for access to said identified resource to be transmitted over said bus.

27. In a data processing system comprising a plurality of processors each of which accesses multiple resources over a bus shared by said processors, and a system memory connected to the bus for storing entries each of which corresponds to one of said resources and designates whether said resource is available for use, a method of operating each of said processors, comprising generating a request for access to one of said resources, said request identifying said resource, storing in a local memory in said processor copies of said system memory entries, examining said copies of said entries stored in said local memory in response to said request for access to determine whether said resource identified in said request is available for use, preventing said request from being transmitted over said bus if one of said copies of said entries stored in said local memory designates said identified resource as being unavailable, and otherwise transmitting said request over said bus, determining when said identified resource has become available, updating the copy of said entry stored in said local memory that corresponds to said identified resource to indicate that said identified resource has become available in response to said determining, and thereafter permitting a subsequent request for access to said identified resource to be transmitted over said bus.

28. In a data processing system that includes a plurality of processors interconnected by a bus, said processors having a plurality of possible modes of operation, a method comprising storing in a system memory connected to said bus a plurality of entries each of which corresponds to one of said modes of operation and indicates whether said mode is available for use by one of said processors, causing each of said processors to:

generate a request to operate in one of said modes, said request identifying said mode, store in a local memory copies of said system memory entries, examine said copies of said entries stored in said local memory in response to said request for access to determine whether said mode identified in said request is available for use, prevent said request from being transmitted over said bus to said system memory if one of said copies of said entries stored in said local memory designates said mode identified in said request as being unavailable, and otherwise transmit said request to said system memory over said bus.

29. The method of claim 28 further comprising causing each of said processors to:

determine when said identified resource has become available, update the copy of said entry stored in said local memory that corresponds to said identified resource to indicate that said identified resource has become available in response to said determining, and thereafter permit a subsequent request for access to said identified resource to be transmitted to said system memory over said bus.

30. A computer system comprising a plurality of processors connected to a bus for executing a computer program, a system memory connected to the bus and storing said computer program, said system memory including entries each of which corresponds to a region of said computer program and designates whether said region is available for processing by one of said processors, each one of said processors including a processing unit for executing said computer program and generating an access request for a selected one of said regions of said computer program, a local memory for storing copies of said system memory entries, and a controller for examining said copies of said entries stored in said local memory in response to said access request to determine whether said selected one of said regions is available for processing by said processing unit, said controller preventing said access request from being transmitted over the bus if one of said copies of said entries stored in said local memory designates said selected region as being unavailable, and otherwise transmitting said access request over the bus.

31. A processor for a computer system that includes a plurality of processors connected to a bus for executing a computer program, and a system memory connected to the bus for storing said computer program and entries each of which corresponds to a region of said computer program and designates whether said region is available for processing by one of said processors, said processor including a processing unit for executing said computer program and generating an access request for a selected one of said regions of said computer program, a local memory for storing copies of said system memory entries, and a controller for examining said copies of said entries stored in said local memory in response to said access request to determine whether said selected one of said regions is available for processing by said processing unit, said controller preventing said access request from being transmitted over the bus if one of said copies of said entries stored in said local memory designates said selected region as being unavailable, and otherwise transmitting said access request over the bus.

* * * * *